Dec. 24, 1968
H. E. RIORDAN
3,417,626
SINGLE-AXIS ACCELEROMETER
Filed May 25, 1965
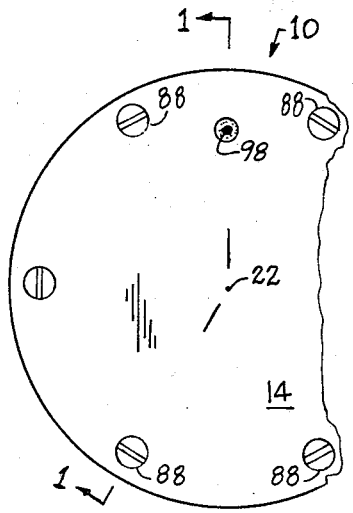
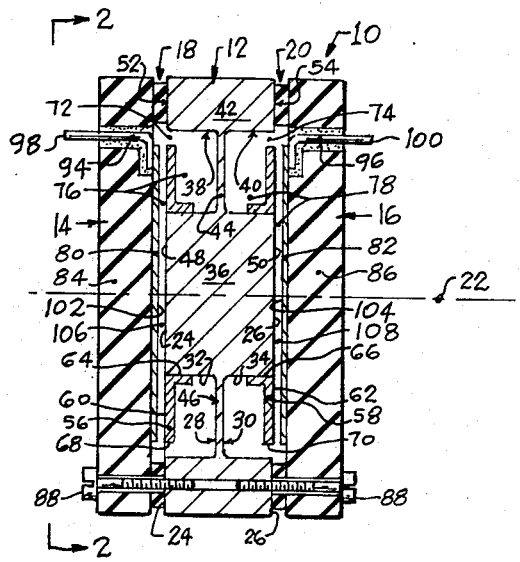
FIG. 1
FIG. 2
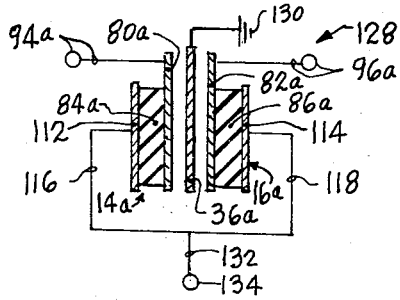
FIG. 4
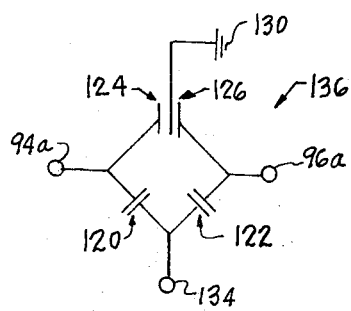
FIG. 5
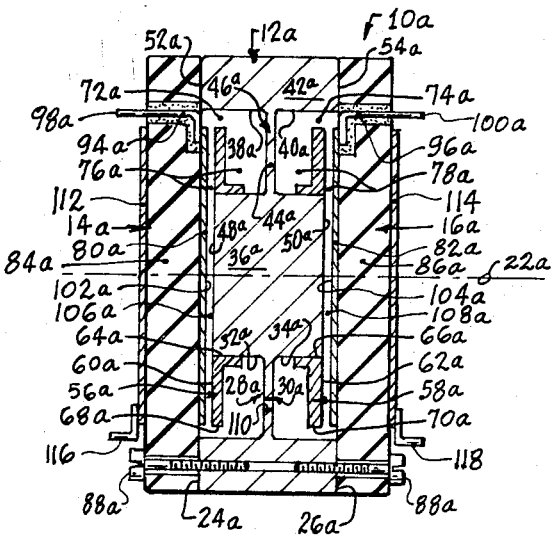
FIG. 3.
HUGH E. RIORDAN
INVENTOR.
BY
Thomas W. Kennedy

United States Patent Office 3,417,626
Patented Dec. 24, 1968

3,417,626
SINGLE-AXIS ACCELEROMETER
Hugh E. Riordan, Wyckoff, N.J., assignor to General
Precision Inc., Little Falls, N.J., a corporation of
Delaware
Filed May 25, 1965, Ser. No. 458,539
7 Claims. (Cl. 73—516)

ABSTRACT OF THE DISCLOSURE

An accelerometer comprising a conductive center plate with a sensing axis and a pair of axially-spaced conductive end plates, which are sealingly connected to said center plate. The center plate has a pair of axially-spaced end faces respectively having annular, coaxial grooves disposed in back-to-back arrangement. Said grooves have radially-inner sidewalls defining a proof-mass portion with axially-outer surfaces disposed substantially at right angles to said axis and have radially-outer sidewalls defining a support frame portion, and have a common bottom wall defining a diaphragm-spring portion, which interconnects said proof mass and said frame. Said end plates sealingly connect to said frame portion to form a pair of variable-volume chambers for containing damping fluid. Said end plates also have axially-inner surfaces arranged parallel to said proof-mass surfaces and separated therefrom by a pair of axial gaps, which vary oppositely in thickness with a displacement of said proof mass relative to said end plates.

---

The present invention relates to accelerometers, and particularly to a single-axis accelerometer which has a capacitive pickoff.

A prior art accelerometer is described in U.S. Patent No. 2,870,422. Said prior art accelerometer has an outer support body of cylindrical shape with a longitudinal sensing axis, an inner proof-mass body coaxial therewith, and a pair of coaxial diaphragm springs interconnecting said outer body and inner body for displacement of said inner body along said axis relative to said outer body in amount proportional to the axial component of an acceleration force acting thereupon. The accelerometer also has an induction-type pickoff means with adjacent co-operating portions respectively mounted on the outer body and on the inner body for measuring said displacement and said axial force.

One problem with said prior-art accelerometer is the difficulty in minimizing ratio of accelerometer size and weight relative to accelerometer strength and ruggedness.

A further problem with prior art accelerometers is that the displacement of the proof mass must be relatively large in order to obtain an adequate output from the induction-type pickoff. This large required displacement makes necessary the use of a relatively weak suspension spring, thereby making the natural frequency of the instrument undesirably low.

A still further problem with prior art instruments resides in the use of two suspension springs. Very careful matching and alignment of both springs is necessary to prevent the incorporation of redundant stresses which by their relaxation will produce a null shift in the instrument. In addition, misalignment of the springs from whatever cause arising during or after assembly will produce errors in the scale factor of the instrument.

In accordance with one embodiment of the present invention, the ratio of accelerometer size to strength can be minimized by using a differential capacitive type of pickoff means in the accelerometer and by using the proof mass as the center moving plate of the pickoff means.

Accordingly, it is one object of the invention to provide a single-axis accelerometer in which the ratio of accelerometer size and weight relative to the accelerometer strength and ruggedness is minimized.

It is another object of the invention to provide a fluid-damped, single-axis accelerometer in which air can be effectively used as the damping fluid.

It is a further object of the invention to provide a single-axis accelerometer, which has a differential capacitance type of pickoff means and in which the ratio of accelerometer size and weight relative to pickoff sensitivity and accuracy is minimized.

It is a still further object of the invention to provide a single-axis accelerometer, which has a capacitive bridge integral therewith that has a pair of varying capacitances forming a pair of active arms of said capacitive bridge and that also has a pair of fixed capacitances forming a pair of passive arms of said bridge.

It is an additional object of the invention to provide a single-axis accelerometer having a single suspension spring in the form of an annular disc.

To the fulfillment of these and other objects, the invention provides an accelerometer comprising a conductive center plate with a sensing axis and a pair of axially-spaced conductive end plates, which are sealingly connected to said center plate. The center plates has a pair of axially-spaced end faces respectively having annular, coaxial grooves disposed in back-to-back arrangement. Said grooves have radially-inner sidewalls defining a proof-mass portion with axially-outer surfaces disposed substantially at right angles to said axis and have radially-outer sidewalls defining a support frame portion, and have a common bottom wall defining a diaphragm-spring portion, which interconnects said proof mass and said frame. Said end plates sealingly connect to said frame portion to form a pair of variable-volume chambers for containing damping fluid. Said end plates also have axially-inner surfaces arranged parallel to said proof-mass surfaces and separated therefrom by a pair of axial gaps, which vary oppositely in thickness with a displacement of said proof mass relative to said end plates.

Other objects of the invention will become apparent upon reading the annexed detailed description in connection with the drawings, wherein like parts are designated by like numerals throughout the several views, and wherein:

FIG. 1 is a sectional view of a single-axis accelerometer embodying features of the present invention;

FIG. 2 is a sectional view taken along line 2—2 of FIG. 1;

FIG. 3 is another sectional view corresponding to FIG. 1 of an alternate embodiment of a single-axis accelerometer embodying features of the present invention;

FIG. 4 is an electrical schematic representation of portions of FIG. 3; and

FIG. 5 is a circuit diagram corresponding to FIG. 4.

Referring to FIG. 1, accelerometer 10 comprises a center plate 12 and a pair of end plates 14, 16 which are disposed on either sides thereof and which have a pair of spacer rings 18, 20 disposed therebetween.

Center plate 12, which is preferably a one-piece rolled plate composed of a spring metal, such as a nickel iron alloy metal, or the like, has a sensing axis 22, and a pair of axially-spaced end faces 24, 26, which have respectively a pair of annular coaxial grooves 28, 30 that are disposed in back-to-back arrangement.

Grooves 28, 30 have respective radially-inner groove sidewalls 32, 34, which define a radially-inner mass portion 36. Grooves 28, 30 also have respective radially-outer groove sidewalls 38, 40, which define an outer support-frame portion 42. Grooves 28, 30 also have a common bottom wall 44, which defines an intermediate diaphragm-spring portion 46 that interconnects proof mass 36 to frame 42.

Proof mass 36 has a pair of axially-outer surfaces 48, which are preferably parallel to each other and which are disposed at right angles to axis 22. Frame 42 also has a pair of axially-outer surfaces 52, 54, which are also preferably parallel to each other and which are disposed substantially at right angles to axis 22. Adjoining surfaces 48, 52 and 50, 54 are preferably coplanar for ease of manufacture and in order to minimize thermal expansion error.

Sidewalls 32, 34, which are preferably cylindrical in shape about axis 22, support annular overhang portions or rings 56, 58, which project in a radially outward direction therefrom and which overhang their respective grooves 28, 30.

Rings 56, 58 have respective axially-outer surfaces 60, 62. Surfaces 60, 62 are preferably coplanar with respective surfaces 48, 50. In this way, the ratio of the diameter of sidewalls 38, 40 relative to the total area of surfaces 48, 60 and 50, 62 is minimized. With this construction, the size of support frame 42 relative to the capacitance sensitivity and fluid pumping capacity of proof mass 36 is minimized.

Rings 56, 58, which are L-shaped in cross-section, also have radially-inner surfaces 64, 66 of cylindrical shape, which are respective journaled over sidewalls 32, 34 with a shrink-fit therebetween for ease of manufacture. Rings 56, 58 also have respective radially-outer surfaces 68, 70, which are separated from outer sidewalls 38, 40 by radial gaps 72, 74.

End plates 14, 16, which are disposed on either side of center plate 12 coaxially therewith, enclose grooves 28, 30 and form respective chambers 76, 78. End plates 14, 16 are preferably of laminate construction, and include respective metal films 80, 82 and insulating back-up members 84, 86. Films 80, 82 are preferably composed of aluminum or like metal, and are disposed on the axially-inner sides of respective plates 14, 16. Back-up members 84, 86 are preferably composed of pyrex-plate glass blanks or the like, to which respective films 80, 82 are bonded such as by a plating method.

Back-up members 84, 86 are connected to frame 42 by bolts 88 or like connection means. Back-up members 84, 86 are also separated from frame 42 by respective annular spacer members 18, 20, which are preferably composed of an insulating material.

Spacers 18, 20 preferably also seal chambers 76, 78 and minimize leakage therefrom. Spacers 18, 20 preferably also have a low coefficient of thermal expansion.

Films 80, 82 have respective terminals 94, 96, which are platinum pins, or the like, and which are cemented to back-up members 84, 86. Terminals 94, 96 have axially-outer tip portions 98, 100 for ease of electrical connection. Films 80, 82 also have respective axially-inner surfaces 102, 104, which are respectively separated from adjacent surfaces 48, 50 by axial gaps 106, 108.

When accelerometer 10 is in a null condition, axial gaps 106, 108 are preferably substantially equal in thickness; but when proof mass 36 displaces relative to frame 42, axial gaps 106, 108 vary oppositely in thickness. With such construction, films 80, 82 and proof mass 36 form a differential capacitor for use as a pickoff and detection means.

Chamber 76, 78 preferably contain a damping fluid (not shown), which is preferably a gas, such as air or the like, that has a viscosity that changes very slightly with temperature. As mentioned before, gaps 106, 108 vary oppositely in thickness with a displacement of proof mass 36 relative to end plates 14, 16. With this construction, a pumping-type of damping restraint is provided against proof mass 36 whereby vibration of proof mass 36 and overstressing of diaphragm 46 is minimized.

Radial gaps 72, 74 form orifice-like passages and rings 56, 58 divide their respective chambers 76, 78 into a groove antechamber and a gap antechamber. Thus, flow of said damping fluid is regulated in passing to and from grooves 28, 30.

Accelerometer 10 is preferably made by the following manufacturing method:

Select a metal center plate 12 having axially-spaced, parallel, flat end faces 24, 26;

Provide coaxial annular grooves 28, 30 in a back-to-back arrangement in said end faces 24, 26, making cylindrical radially-inner sidewalls 32, 34 and outer sidewalls 38, 40 of substantially equal respective radius for separating the radially-inner proof-mass portion 36 from the radially-outer frame portion 42;

Journal overhang rings 56, 58 on the groove inner sidewalls 38, 40;

Make the axially-outer surfaces 60, 62 of rings 56, 58 coplaner with the adjacent axially-outer faces 24, 26 of the center plate 12; and Connect the flat inner sides of a pair of end plates with spacer rings to the frame portion end faces thereby leaving substantially equal axial gaps between the proof-mass portion and the flat inner sides of the end plates.

In summary, embodiment 10 provides a single-axis accelerometer, in which the ratio of accelerometer size and weight relative to accelerometer strength and ruggedness is minimized, in which air can be used as damping fluid, and in which a differential type of pickoff is used wherein the ratio of accelerometer size and weight relative to pickoff sensitivity and accuracy is minimized.

Alternate embodiment of accelerometer 10a is illustrated in FIG. 3. Those parts of FIG. 3 similar to corresponding parts of FIG. 1 have like numerals with a subscript a added thereto.

Accelerometer 10a has a center plate 12a and a pair of end plates 14a, 16a. Center plate 12a has a sensing axis 22a and a pair of axially-spaced end faces 24a, 26a with respective grooves 28a, 30a.

Grooves 28a, 30a have respective inner sidewalls 32a, 34a defining a proof mass 36a, and have outer sidewalls 38a, 40a defining a support frame 42a, and have a common bottom wall 44a forming a diaphragm 46a.

Proof mass 36a has axially-outer surfaces 48a, 50a; and frame 42a has similar axially-outer surfaces 52a, 54a. The axial distance between frame surfaces 52a, 54a is greater than the corresponding distance between proof-mass surfaces 48a, 50a whereby spacers are not required.

Sidewalls 32a, 34a support respective overhang rings 56a, 58a, which have axially-outer surfaces 60a, 62a that are coplanar with respective proof-mass surfaces 48a, 50a.

Rings 56a, 58a have respective radially-inner surfaces 64a, 66a, and have radially-outer surfaces 68a, 70a forming radial gaps 72a, 74a.

End plates 14a, 16a, which enclose grooves 28a, 30a and form respective chambers 76a, 78a, are comprised of inner metal films 80a, 82a with respective back-up members 84a, 86a, that are connected by bolts 88a to frame 42a.

Films 80a, 82a have respective terminals 94a, 96a with tip portions 98a, 100a. Films 80a, 82a have also respective inner surfaces 102a, 104a, which are separated from surfaces 48a, 50a by respective axial gaps 106a, 108a.

Diaphragm 46a has a cut-out 110 for use as a passage interconnecting chambers 76a, 78a. End plates 14a, 16a also have respective outer films 112, 114, which are disposed on the axially-outer sides thereof. Films 112, 114 have respective terminals 116, 118.

Back-up members 84a, 86a, which are preferably composed of glass, or like dielectric material, are sandwiched between respective films 80a, 112 and 82a, 114 thereby forming a pair of passive capacitors 120, 122. Damping fluid (not shown), such as air or like dielectric medium, is disposed in axial gaps 106a, 108a and fluid portions therein vary oppositely in thickness with a displacement of proof mass 36a relative to frame 42a, thereby forming a pair of active capacitors 124, 126.

FIG. 4 illustrates an electrical schematic representation 128 of back-up members 84a, 86a, and of inner films 80a, 82a with their terminals 94a, 96a and of outer films 112, 114 with their terminals 116, 118. Schematic 128 also illustrates proof mass 36a which is movable relative to plates 14a, 16a. In FIG. 4, proof mass 36a has a ground connection 130; and terminals 116, 118 are connected by a common lead 132, which has an intermediate terminal 134.

FIG. 5 illustrates a circuit diagram 136 of a capacitive bridge, which is equivalent to schematic arrangement 128, and which shows terminals 94a, 96a, 134 and ground 130. Circuit 136 also shows the pair of active capacitors 124, 126 and shows the pair of passive capacitors 120, 122.

In summary, alternate embodiment 10a provides a single-axis accelerometer 10a with a capacitive bridge 136 integral therewith. Bridge 136 has a pair of varying capacitances or active arms 124, 126 and also has a pair of fixed capacitances or passive arms 120, 122.

While the present invention has been described in a preferred embodiment, it will be obvious to those skilled in the art that various modifications can be made therein within the scope of the invention; and it is intended that the appended claims cover all such modifications.

What is claimed is:
1. An accelerometer comprising:
a conductive center plate with a sensing axis and with a pair of axially-spaced end faces respectively having annular coaxial grooves disposed in back-to-back arrangement, said grooves having respective radially-inner sidewalls defining a proof-mass portion with axially-outer surfaces disposed substantially at right angles to said axis and having radially-outer sidewalls defining a support-frame portion and having a common bottom wall defining a diaphragm-spring portion interconnecting said proof mass and said frame; and
a pair of axially-spaced conductive end plates sealingly connecting to said center plate frame portion to form a pair of variable-volume chambers therebetween for containing damping fluid, said end plates having axially-inner surfaces disposed parallel to said proof-mass surfaces and separated therefrom by a pair of axial gaps which vary oppositely in thickness with displacement of said proof mass relative to said end plates thereby forming a pair of squeeze-film fluid dampers and also thereby forming a differential capactive pickoff.

2. An accelerometer as claimed in claim 1, in which the frame portion has axially-outer surfaces respectively coplanar with the proof-mass surfaces whereby pickoff error due to axial thermal expansion is minimized.

3. An accelerometer as claimed in claim 1, in which said groove inner sidewalls have respective overhang ring portions projecting radially outwardly therefrom and overlapping said grooves with axially-outer surfaces respectively coplanar with said proof-mass surfaces whereby the ratio of accelerometer size and weight to accelerometer damping capacity and pickoff sensitivity is minimized.

4. An accelerometer as claimed in claim 1, in which said end plates are laminates comprising axially-inner conductive films with connecting terminals and insulating back-up members mounted on the support frame for ease of manufacture.

5. An accelerometer as claimed in claim 1, in which said end plates are laminates comprising a dielectric member disposed between a pair of parallel metal films.

6. An accelerometer as claimed in claim 5, in which said films have integral terminals with tip portions disposed on the exterior of the accelerometer for ease of connection thereto.

7. A single-axis accelerometer comprising:
a center plate with a sensing axis and a pair of axially-spaced end faces having respectively a pair of annular coaxial grooves disposed in back-to-back arrangement, said grooves having radially-inner sidewalls defining a proof-mass portion and having radially-outer sidewalls defining a frame portion and having a common bottom wall forming a diaphragm portion interconnecting the proof mass and frame, said proof mass having a pair of axially-outer surfaces, said frame having a corresponding pair of axially-outer surfaces, said pair of inner sidewalls having a pair of overhanging portions extending in a radially-outward direction therefrom and overhanging the pair of grooves, said pair of rings having a pair of axially-outer surfaces respectively coplanar with said pair of proof-mass surfaces; and
a pair of end plates connected ot either side of the center plate coaxially therewith having a pair of spacer rings disposed on either side of the center plate sealing the pair of joints between the center plate and pair of end plates and enclosing said pair of grooves and forming a pair of sealed chambers respectively including said grooves, said end plates having a laminate construction comprising a pair of metal films disposed on the axially-inner sides thereof and a pair of insulating back-up members to which the respective films are bonded, said pair of films having a pair of terminals with axially-outer tip portions disposed on the axially-outer sides of said back-up members for ease of accessibility from the exterior thereof, said pair of films having a respective pair of axially-inner surfaces separated from the adjacent proof-mass surfaces by a pair of axial gaps varying oppositely in thickness with displacement of the proof mass relative to the end plates thereby forming a differential capacitive pickoff, said pair of chambers contain a pair of volumes of damping gas filling said grooves and said axial gaps of said chambers, said pair of gas volumes varying oppositely in pressure with said variation oppositely in axial gap thicknesses thereby forming a proof-mass damper.

References Cited

UNITED STATES PATENTS

| 2,440,605 | 4/1948 | Hathaway | 73—516 X |
| 2,643,869 | 6/1953 | Clark | 73—517 X |
| 2,966,802 | 1/1961 | Steen | 73—516 |
| 3,028,760 | 4/1962 | Diamond | 73—516 |
| 3,229,530 | 1/1966 | Wilcox et al. | 73—517 |
| 3,323,372 | 6/1967 | Kistler et al. | 73—517 |

JAMES J. GILL, *Primary Examiner.*